United States Patent [19]
Cooperman et al.

[11] Patent Number: 5,872,787
[45] Date of Patent: Feb. 16, 1999

[54] DISTRIBUTED SWITCH BUFFER UTILIZING CASCADED MODULAR SWITCH CHIPS

[75] Inventors: Michael Cooperman, Framingham; Richard Sieber, Attleboro, both of Mass.

[73] Assignee: GTE Laboratories Incorporated, Waltham, Mass.

[21] Appl. No.: 648,371

[22] Filed: May 15, 1996

[51] Int. Cl.$^6$ .................................................. H04L 12/54
[52] U.S. Cl. .......................................... 370/412; 370/429
[58] Field of Search .................................... 370/412, 413, 370/414, 415, 416, 417, 418, 427, 429, 229, 230, 231, 395, 428

[56] References Cited

U.S. PATENT DOCUMENTS

| | | | |
|---|---|---|---|
| 5,268,896 | 12/1993 | Pauwels .................................. | 370/413 |
| 5,367,520 | 11/1994 | Cordell .................................... | 370/395 |
| 5,404,537 | 4/1995 | Olnowich et al. ....................... | 370/388 |
| 5,471,468 | 11/1995 | Sandin et al. ........................... | 370/389 |
| 5,583,861 | 12/1996 | Holden .................................... | 370/395 |
| 5,636,210 | 6/1997 | Agrawal .................................. | 370/390 |

OTHER PUBLICATIONS

Kozaki et al., *IEEE Journal on Selected Areas in Communications*, vol. 9(8):1239–1247 (1991).
Shobatake et al., *IEEE Journal on Selected Areas in Communications*, vol. 9(8):1248–1254 (1991).

*Primary Examiner*—Chi H. Pham
*Assistant Examiner*—Kwang B. Yao
*Attorney, Agent, or Firm*—Leonard Charles Suchyta

[57] ABSTRACT

A distributed switch buffer and method for switch buffer enlargement use standard switch chips as modules that are cascaded in multiples to provide arbitrarily large switch buffers for any number of inputs and outputs. Any type of packet switch chip may be used in any combination. A packet that enters the first switch chip in the cascade automatically gets transferred to other switch chips as part of an integrated buffering scheme. Every input of the switch is connected to all of the switch chips in the first stage of the distributed buffer. The queue of each output of the switch is then expanded by adding more stages of switch chips. All outputs of each switch chip go to the inputs of the same switch chip in the next stage of the distributed buffer so that all of the buffer space of all the cascaded switch chips is available to each input port. The queue may be expanded indefinitely by cascading more chips. In one embodiment, inputs are connected to all the cascaded switch chips for each output port so that each chip only needs to have one output. The number of inputs for each switch chip in the intermediate stages need not equal the number of outputs from that stage, and it is possible to use a different number of cascade stages for each switch output port.

12 Claims, 3 Drawing Sheets

DISTRIBUTED SWITCH BUFFER UTILIZING CASCADED MODULAR SWITCH CHIPS

FIELD OF THE INVENTION

The present invention relates to electronic data communications systems and, in particular, to high speed electronic signal switching systems.

BACKGROUND

In a packet switch fabric, a large buffer (queue) is generally desirable in order to minimize packet loss. Packet loss occurs particularly during periods of network congestion, when packets enter the switch faster than they can be sent to the output ports and the switch buffers therefore fill to capacity. It is possible for sufficient traffic on merely one channel to cause loss of packets from that channel due to overflow of the buffer for that particular destination output. As a consequence of buffer overflow, incoming packets are discarded until space in the buffer is made available by the departure of a packet for the switch output port.

Buffer overflow can even occur in an asynchronous transfer mode (ATM) switch having priority capability. When ATM cells contend for the same output port of the switch, the cells with a higher priority will be sent to the output first while the lower priority cells will be stored in the switch buffer. During heavy traffic it is possible for these lower priority cells to completely fill the buffer for a particular output port, leaving no room for incoming cells of any priority. Cells attempting to go to an output port once its buffer is full are permanently lost from the datastream. Cell loss will continue until the buffer is no longer full. It is obvious, therefore, that the larger the buffer available to an output port, the less likely it is that such cell loss will occur.

There is a limit, however, on how large a buffer will fit onto a standard switch chip. For an ATM chip, buffers with a capacity of 64 to 256 cells are common. The maximum buffer size is generally limited by the physical space available on the chip, with the size of the chip itself being limited by both space and manufacturing considerations. The larger and more complicated a chip is, the more likely it is that a manufacturing defect will occur that will force rejection of the whole chip. Manufacture of a large switch chip can therefore can be extremely expensive.

One of the problems imposed by the physical size limits of an ATM switch chip is that only a limited number of inputs and outputs can be made available. This problem has previously been addressed by interconnecting several such chips to provide switches with arbitrarily large numbers of inputs and outputs. For example, Shobatake et. al. use a multistage Clos network of 8×8 switch chips to create a 64×64 switch [Shobatake, Y., Motoyama, M., Shobatake, E., Kamitake, T., Shimizu, S., Noda, M. and Sakaue, K., "A One Chip Scalable 8*8 ATM Switch LSI Employing Shared Buffer Architecture," *IEEE Journal on Selected Areas in Communications*, Vol. 9, No. 8, October 1991, pp. 1248–1254]. The purpose of interconnecting the switch chips in this device is clearly to expand number of inputs and outputs, not to expand the size of the switch buffer. Shobatake et. al. in fact indicate that "an interconnected ATM switch tends to show worse cell loss rate than a unit ATM switch itself because of the internal congestion" [Id at 1284].

The three-stage Clos network utilized by Shobatake et. al. has each input connected to only one of the chips in the first stage of the network. The outputs of this stage are then connected to various inputs of each of the chips in the second stage, with each first-stage chip output being connected to only one input of one second-stage chip, and with each first-stage chip being connected via its output ports to more than one second-stage chip. Each stage of the interconnected network therefore functions more as part of a switching matrix than as part of an expanded switch buffer.

It is clear from examination of the Shobatake et. al. switch that additional buffer space is not available to any input as a result of the three-stage architecture. The Clos interconnection does not expand the switch buffer size either per input or per output port. For example, if all 8 cells coming into a chip in the Shobatake et. al. switch are intended for output 1 of that chip, the interconnected switch will not be any more likely than a single switch chip to prevent buffer overflow because the input ports on the chip in question do not have access to any of the buffer space available on the other interconnected chips. Essentially, this means that cells coming into input port 1 will never be able to access buffers for input port 9 or higher. The Shobatake et. al. switch therefore does not increase the buffer size at all, merely the available number of inputs and outputs as well as the potential delay through the switch.

Kozaki et. al describe a 64×64 switch achieved using 8 32×32 switching boards and a 1024×1024 switch constructed in a three-stage network from 96 32×32 switching boards [Kozaki, T., Endo, N., Sakurai, Y., Matsubara, O., Mizukami, M., and Asano, K., "32×32 Shared Buffer Type ATM Switch VLSI's for B-ISDN's," *IEEE Journal on Selected Areas in Communications*, Vol. 9, No. 8, October 1991, pp.1239–1247]. Again, these devices are solely directed to providing more inputs and outputs to a switch fabric than are available on existing ATM switch chips; no additional buffer capacity is provided. In both of these devices, a cell entering at a particular input is always sent to the same one of the switch chips, regardless of the output destination of the cell. If there is heavy traffic on that single input, or, alternatively, heavy traffic directed to a particular output, buffer overflow with resulting cell loss can occur even if the remainder of the inputs have no traffic and the remaining switch buffers are unused.

While creating switches with larger numbers of inputs and outputs has desirable aspects, and doing so via interconnecting smaller switch chips provides certain fabrication efficiencies and economies, it is of little practical value if packet loss counts or chip rejection rates commensurately increase. What has been needed, therefore, is a way to avoid the switch buffer size limitations that are imposed by the physical size limitations of switch chips.

OBJECTS OF THE INVENTION

Accordingly, the primary object of the present invention is to increase the buffer size that can be provided to a switch fabric utilizing existing switch chips.

A particular object of the invention is to provide a practical way to supply a switch printed circuit board that is easily adapted for the varying switch buffer size needs of a variety of customers.

SUMMARY

The distributed switch buffer and method for switch buffer enlargement of the present invention use standard switch chips as modules that are cascaded in multiples to provide arbitrarily large switch buffers for any number of inputs and outputs. Any type of packet switch chip may be used in any combination. A packet that enters the first switch chip in the cascade automatically gets transferred to other switch chips as part of an integrated buffering scheme.

In a first aspect of the invention, every input of the switch is connected to all of the switch chips in the first stage of the distributed buffer. The queue of each output of the switch is expanded by adding more stages of switch chips. An important aspect of the invention is that all outputs of each switch chip go to the inputs of the same switch chip in the next stage of the distributed buffer. This means that all the buffer space of all the cascaded switch chips is available to each input port. The queue can be expanded indefinitely by cascading more chips.

In an alternate embodiment of the distributed buffer, inputs are connected to all the cascaded switch chips for each output port. In this embodiment, when the earlier stages of the buffer are empty for a particular output port, packets flow directly from the input ports into the last stage. When the last stage fills up, packets flow into the previous stage before entering the final stage. An advantage of this embodiment is that each chip only needs to have one output.

The number of inputs for each switch chip in the intermediate stages need not equal the number of outputs from that stage. It is also possible to use a different number of cascade stages for each switch output port. Applications requiring a very low packet loss will preferentially use output ports with large buffers created by a very long switch chip cascade, since a larger buffer will result in lower packet loss. Applications that can tolerate greater packet loss might preferentially select output ports with shorter switch chip cascades, potentially seeing shorter in-buffer delay and lower costs.

DETAILED DESCRIPTION OF THE PREFERRED EMBODIMENTS

The distributed switch buffer and method for switch buffer enlargement of the present invention use standard switch chips as modules that are cascaded in multiples to provide arbitrarily large switch buffers for any number of inputs and outputs. Any type of packet switch chip may be used in any combination to implement this invention, although certain efficiencies may be found in using all one type of chip. A preferred embodiment is constructed with ATM switch chips, ATM having the advantage of uniform packet size that makes it easier to calculate likely buffer usage. The present invention allows a switch buffer to be arbitrarily increased in size without redesigning either the overall switch or the specific switch chips used.

Use of relatively small single chip switch architectures has speed advantages as well as less chance of manufacturing defects. Advantage can be taken of this by putting two or more smaller switches together in order to create a larger switch. The buffer of such a switch is therefore "distributed" across the switch chips. A packet enters the first switch chip in the cascade and automatically gets transferred to other switch chips as part of an integrated buffering scheme. An embodiment of a distributed buffer is shown in FIG. 1 for a 3-stage 4-input to 4-output implementation.

Figure 1:
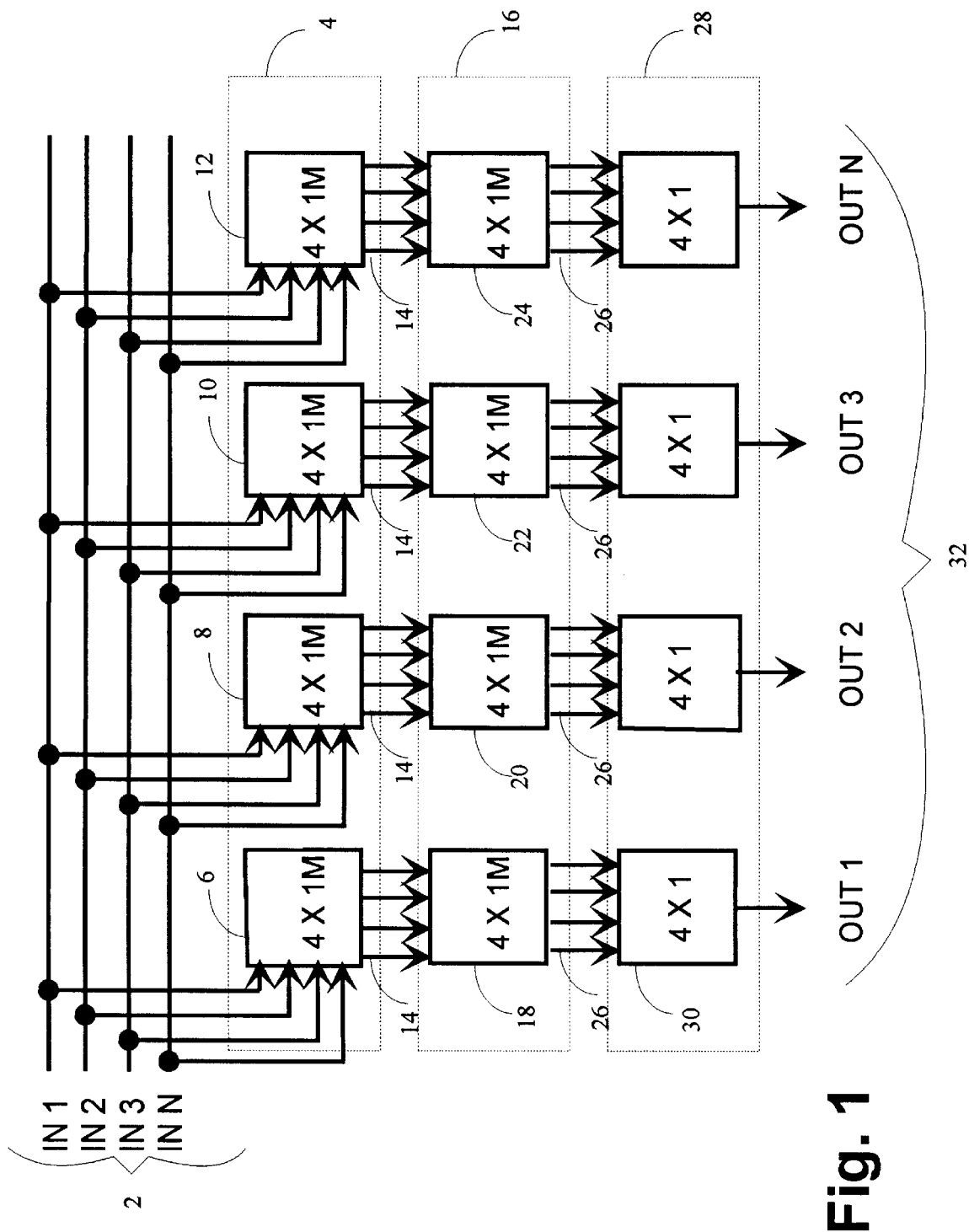
FIG. 1 is a logical block diagram of a 4-input, 4-output 3-stage distributed switch buffer according to the present invention.

In the embodiment of FIG. 1, four inputs 2 enter the first stage 4 of the distributed switch buffer, connecting at all of the first-stage 4X1M switch chips 6, 8, 10, 12. Every input of the switch is connected to all of the switch chips in the distributed buffer first stage 4. Each switch chip output port 14 has a queue size of K packets. The queue of each output 32 of the switch is then expanded by adding more stages of 4X1M chips of the same type, where M signifies that multiple packets are read out in one time slot. The outputs 14 of each first stage 4 switch chip enter the second stage 16, in such a manner that the outputs 14 from each first stage 4 switch chip enter the same second-stage 16 switch chip, i.e. the outputs 14 from switch chip 6 all enter switch chip 18, the outputs 14 from switch chip 8 become the inputs for switch chip 20, and so on for the remaining second-stage switch chips 22, 24. The second-stage 16 switch chips of this implementation are also all 4X1M chips.

In a similar manner, the third stage 28 of the distributed buffer is constructed by making the outputs 26 of the second stage 16 be the inputs of the third stage 28, again in such a manner that all outputs 26 from second-stage switch chip 18 become the inputs for third-stage switch chip 30, and so on. The third stage 28 switch chips are 4x1 chips in this embodiment, so that only one packet is sent by each third-stage 28 switch chip to each output port 32 at a time. An important aspect of the present invention is that all outputs of each switch chip go to the inputs of the same switch chip in the next stage of the distributed buffer. This means that all the buffer space of the cascaded switch chips is available to each input port.

Figure 2:
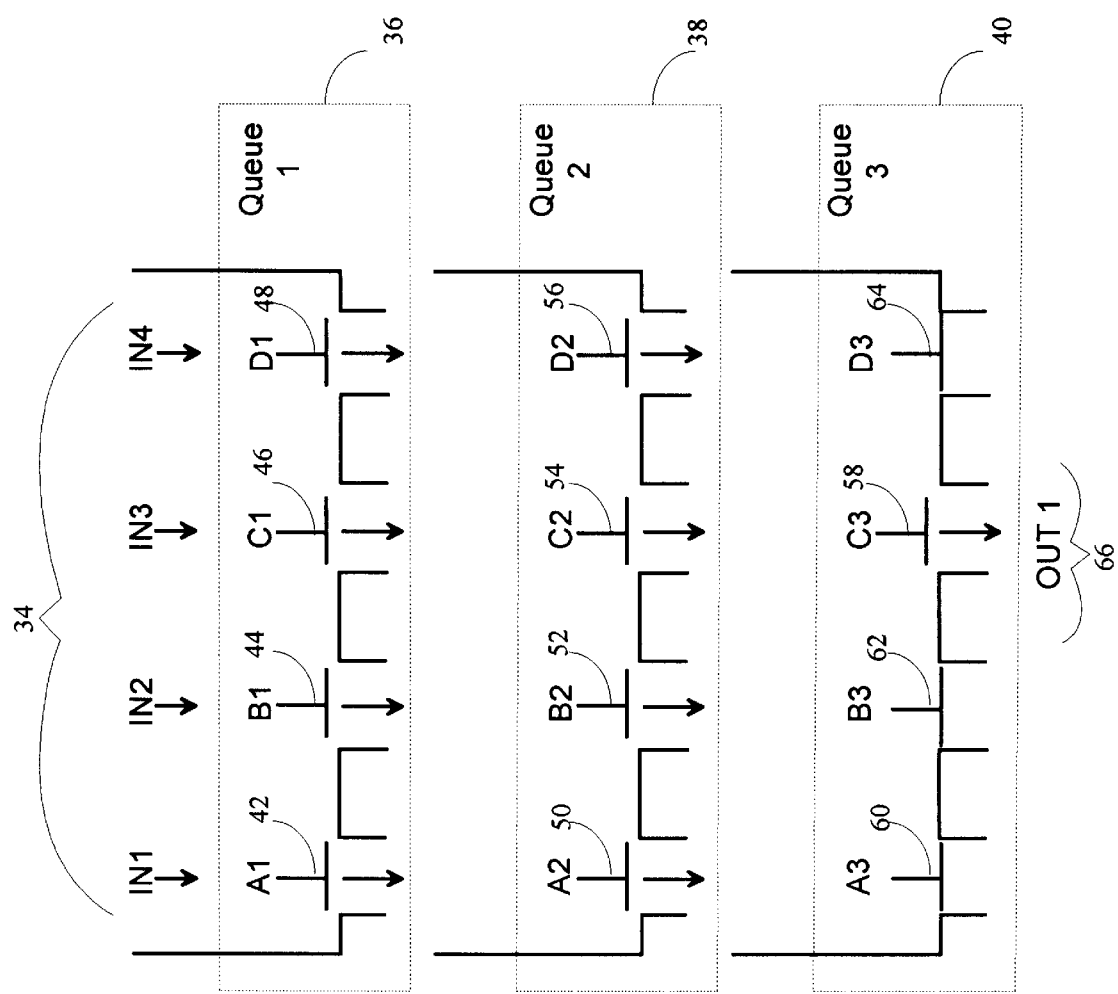
FIG. 2 illustrates via a fluid diagram the operation of the distributed switch buffer of FIG. 1.

FIG. 2 illustrates the operation of the distributed switch buffer of FIG. 1 via a fluid equivalent model. When the three queues are empty, packets enter at the inputs 34 via queue1 36 and are quickly transferred through queue2 38 to queue3 40. Initially, queue1 36 and queue2 38 have open output ports A1 42, B1 44, C1 46, D1 48, A2 50, B2 52, C2 54, and D2 56, and therefore packets flow out of queue1 36 and queue2 38 as soon as they come in. Queue3 38 always has only one open output port, C3 58, the other three outputs A3 60, B3 62, and D3 64 being closed, just as the switch chips in the third stage 28 of the distributed buffer of FIG. 1 have only one output port 32 each. Queue3 40 is the first queue to fill up since only output C3 58 is open to allow a packet to go to the output port 66. When queue3 40 is completely full, outputs A2 50, B2 52, and C2 54 of queue2 38 are closed, allowing queue2 38 to start filling up. Similarly, when queue2 38 is full, queue1 36 starts to fill up. Not until queue1 36 becomes fill do packets begin to be lost. The effective queue size has therefore been increased three-fold. The queue can be expanded indefinitely by cascading more chips.

In the illustration of FIG. 2, when the traffic load decreases, queue1 36 is the first to empty partially, but queue2 38 and queue3 40 stay full since the input rate of packets equals the output rate. When queue1 36 is completely empty and queue2 38 is partially empty, all four outputs 42,44,46,48 of queue1 36 are reopened. Therefore, as a general proposition, when queue(N) is not full, all outputs of queue(N-1) are open, and when queue(N) is full, only one output of queue(N-1) is allowed open.

Many variations of the above embodiment may have effective uses. For example, the number of inputs for each switch chip in the intermediate stages need not equal the number of outputs from that stage. This could take advantage of the fact, for instance, that a one output chip can be much cheaper to make than a multi-output chip since it is sometimes easier to provide inputs than outputs. Other variations could be utilized as part of a scheme to provide an additional type of flow control.

It is also possible to use a different number of cascade stages for each switch output port. The distributed buffer implementation for each output port might in such a case be affected by the quality of service (QoS) a particular application requires. Applications requiring a very low packet loss would preferentially use output ports with very large buffers created by a very long switch chip cascade, since a larger buffer will result in lower packet loss. Applications that can tolerate greater packet loss might preferentially select output ports with shorter switch chip cascades, potentially seeing shorter in-buffer delay and lower costs.

Figure 3:
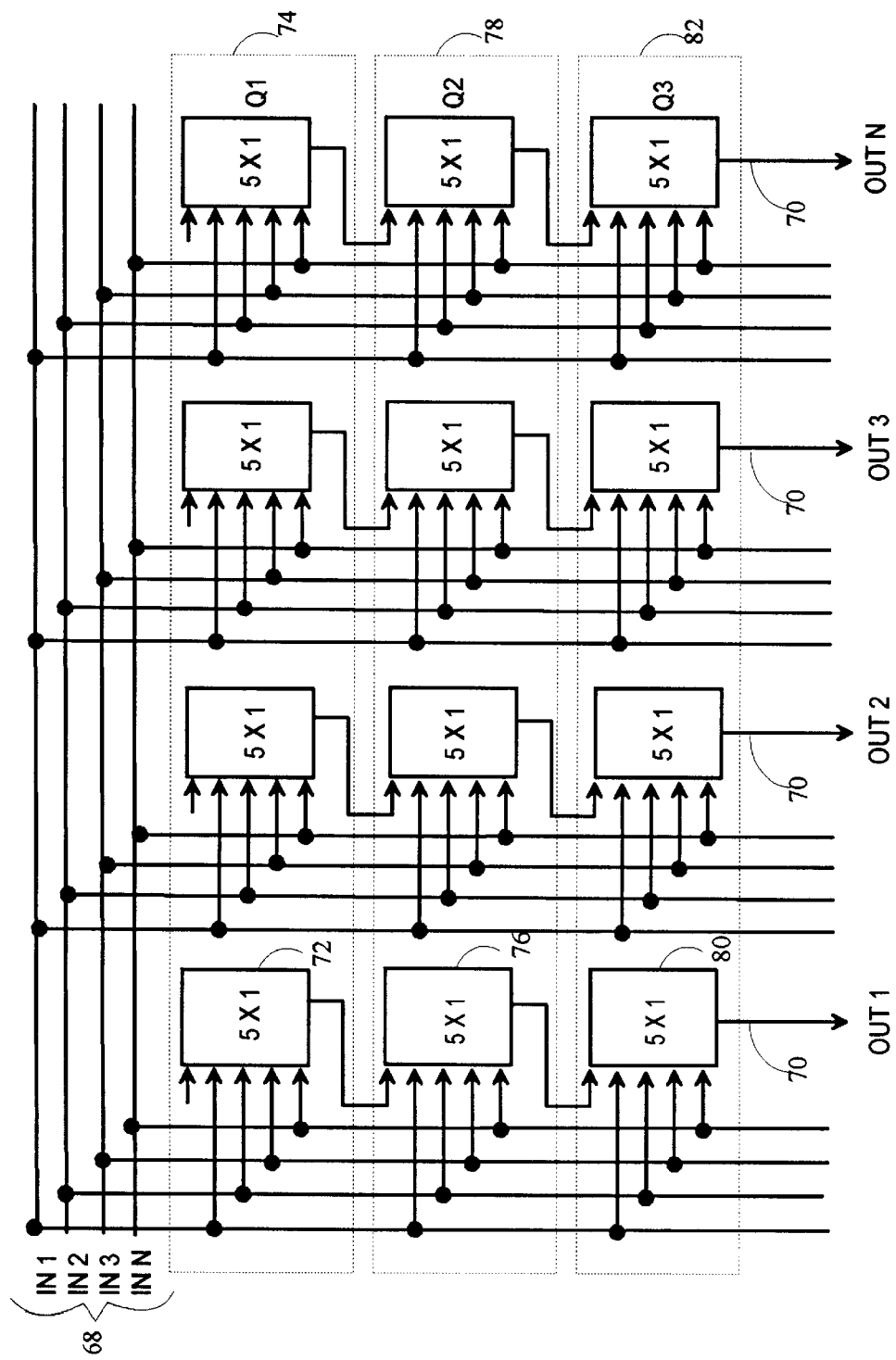
FIG. 3 is an alternate embodiment, utilizing only single-output chips, of a 4-input, 4-output 3-stage distributed switch buffer according to the present invention.

FIG. 3 is a block diagram of a particular alternate embodiment of the distributed buffer for a three-stage 4×4 distributed buffer. In FIG. 3, four inputs 68 are connected to all the cascaded switch chips for each output port 70. For each output port 70, when Q1 72 of stage1 74 and Q2 76 of stage2 78 are empty, packets flow directly from the input ports 68 into Q3 80 of stage3 82. When Q3 80 fills up, packets flows into Q3 80 via Q2 76, into which packets flow directly from input ports 68. When Q2 76 fills up, information flows from input ports 68 into Q1 72, then to Q2 76, finally reaching Q3 80. When the flow of input packets subsides, Q1 72 empties first and Q3 80 last. An advantage of this embodiment is that each chip only needs to have one output, but a potential disadvantage is that an extra input is required for each switch chip.

There may be particular economies of manufacture in the construction of a printed circuit board product that can have an expanded queue that is populated only in the first row for customers who are satisfied with less queue. With the present invention, potentially an enormously large switch buffer can be constructed without paying much of a price in speed other than a small amount of delay in the distributed buffer. Normally, delay variation is a far greater issue for a switch. It may also be useful to substitute the distributed switch buffer of this invention for each stage of the Clos network seen in, for example, the Shobatake et. al. switch, in order to create a switch that can take full advantage of the increased numbers of inputs and outputs provided by the Clos network architecture.

Modifications and substitutions by one of ordinary skill in the art are considered to be within the scope of the present invention, which is not to be limited except by the claims which follow.

What is claimed is:

1. A distributed switch buffer comprising, in combination:
one or more buffer inputs;
one or more buffer outputs; and
one or more cascades of switch chip means, wherein each of said buffer outputs is connected to a corresponding one of said cascades of switch chip means and all of said cascades of switch chip means are connected to all of said buffer inputs, and wherein each of said cascades of switch chip means further comprises, in combination:
single-output switch chip means, connected to said buffer output at a single output and having the same number of inputs as the total number of said buffer inputs; and
at least one additional switch chip means serially connected upstream between said buffer inputs and said single-output switch chip means, each of said serially connected additional switch chip means having the same number of inputs as the total number of said buffer inputs and having the ability to output up to the same number of packets per time slot as there are inputs; and wherein, for each of said cascades of switch chip means:
when said single-output switch chip means is not filled with packets, the one of said serially connected additional switch chip means connected to said single-output switch chip means outputs as many packets per time slot as there are buffer inputs;
when said single-output switch chip means is filled with packets, said serially connected additional switch chip means connected to said single-output switch chip means outputs only one packet per time slot;
when any first one of said serially connected switch chip means is not filled with packets, the one of said serially connected additional switch chip means connected upstream to said single-output switch chip means outputs as many packets per time slot as there are buffer inputs; and
when any first one of said serially connected additional switch chip means is filled with packets, said serially connected additional switch chip means connected upstream to said single-output switch chip means outputs only one packet per time slot.

2. The distributed switch buffer of claim 1, wherein said switch chip means are ATM switch chips.

3. The distributed switch buffer of claim 1, wherein at least some of said cascades of switch chip means are comprised of differing numbers of switch chip means.

4. A distributed switch buffer comprising, in combination:
one or more buffer inputs;
one or more buffer outputs; and
one or more cascades of switch chip means, wherein each of said buffer outputs is connected to a corresponding one of said cascades of switch chip means and all of said cascades of switch chip means are connected to all of said buffer inputs, wherein each of said cascades of switch chip means comprises, in combination:
first single-output switch chip means, connected at a single output to said buffer output and having one more input than the total number of said buffer inputs, all but the extra one of said inputs being one-to-one connected to said buffer inputs; and
at least one additional single-output switch chip means serially connected between said buffer inputs and said first single-output switch chip means, each of said serially connected additional single-output switch chip means having one more input than the total number of said buffer inputs, all but the extra one of said inputs being one-to-one connected to said buffer inputs, and having said single output connected to the extra input of a next downstream one of said single-output switch chip means wherein, for each of said cascades of switch chip means:
when said first single-output switch chip means is not filled with packets, incoming packets flow directly from said buffer inputs into said first single-output switch chip means:
when said first single-output switch chip means is filled with packets, said incoming packets flow into the one of said serially connected additional single-output switch chip means connected directly upstream from said first single-output switch chip means if said upstream additional single-output switch chip means is not already filled with packets; and when any of said serially connected additional switch chip means is filled with packets, said incoming packets flow into the one of said serially connected additional single-output switch chip means connected directly upstream from said filled single-output switch chip means if said upstream additional single-output switch chip means is not already filled with packets.

5. The distributed switch buffer of claim 4, wherein said switch chip means are ATM switch chips.

6. The distributed switch buffer of claim 4, wherein at least some of said cascades of switch chip means are comprised of differing numbers of switch chip means.

7. A method for enlargement of a switch buffer having one or more buffer inputs and one or more buffer outputs, comprising the steps, in combination, of:

connecting each of said buffer outputs to a corresponding one of one or more cascades of switch chip means; and connecting all of said buffer inputs to each of said cascades of switch chip means, wherein each of said cascades of switch chip means is created by the steps, in combination of:

connecting a first single-output switch chip means at a single output to said buffer output, said first single-output switch chip having one more input than the total number of said buffer inputs;

connecting all but the extra one of said inputs of said first single-output switch chip means to said buffer inputs;

serially connecting at least one additional single-output switch chip means between said buffer inputs and said first single-output switch chip means, each of said serially connected additional single-output switch chip means having one more input than the total number of said buffer inputs;

connecting all but the extra one of said inputs of said additional single-output switch chip means to said buffer inputs; and connecting the single output of each of said additional single-output switch chip means to the extra input of a next downstream one of said single-output switch chip means:

when said first single-output switch chip means is not filled with packets, causing incoming packets to flow directly from said buffer inputs into said first single-output switch chip means:

when said first single-output switch chip means is filled with packets, causing said incoming packets to flow into the one of said serially connected additional single-output switch chip means connected directly upstream from said first single-output switch chip means if said upstream additional single-output switch chip means is not already filled with packets; and when any of said serially connected additional switch chip means is filled with packets, causing said incoming packets to flow into the one of said serially connected additional single-output switch chip means connected directly upstream from said filled single-output switch chip means if said upstream additional single-output switch chip means is not already filled with packets.

8. The method for enlargement of a switch buffer of claim 7, wherein said switch chip means are ATM switch chips.

9. The method for enlargement of a switch buffer of claim 7, further comprising the step of utilizing a variable number of switch chip means to construct the various cascades of switch chip means, the number of said switch chip means being used to construct a particular one of said cascades depending on the loss requirements of the corresponding one of said buffer outputs.

10. A method for enlargement of a switch buffer having one or more buffer inputs and one or more buffer outputs, comprising the steps, in combination, of:

connecting each of said buffer outputs to the single output of a single-output switch chip means, said single-output switch chip means having the same number of inputs as the total number of said buffer inputs;

connecting the inputs of said single-output switch chip means serially to at least one additional switch chip means, each of said serially connected additional switch chip means having the same number of inputs as the total number of said buffer inputs and having the ability to output up to the same number of packets per time slot as there are inputs;

inputting packets from said buffer inputs to the inputs of the first in the chain of said serially connected additional switch chip means:

when said single-output switch chip means is not filled with packets, outputting as many packets per time slot as there are buffer inputs from the one of said serially connected additional switch chip means connected to said single-output switch chip means;

when said single-output switch chip means is filled with packets, outputting only one packet per time slot from said serially connected additional switch chip means connected to said single-output switch chip means;

when any first one of said serially connected additional switch chip means is not filled with packets, outputting as many packets per time slot as there are buffer inputs from the one of said serially connected additional switch chip means connected immediately upstream from said first serially connected switch chip means; and when any first one of said serially connected additional switch chip means is filled with packets, outputting only one packet per time slot from the one of said serially connected additional switch chip means connected immediately upstream from said first serially connected switch chip means.

11. The method for enlargement of a switch buffer of claim 10, wherein said switch chip means are ATM switch chips.

12. The method for enlargement of a switch buffer of claim 10, further comprising the step of serially connecting a variable number of switch chip means to each of said buffer outputs, the number of said switch chip means being connected to each of said buffer outputs being dependent on the loss requirements of said buffer output.

* * * * *